United States Patent
Saboo et al.

(10) Patent No.: US 9,817,109 B2
(45) Date of Patent: Nov. 14, 2017

(54) GESTURE RECOGNITION USING FREQUENCY MODULATED CONTINUOUS WAVE (FMCW) RADAR WITH LOW ANGLE RESOLUTION

(71) Applicant: Texas Instruments Incorporated, Dallas, TX (US)

(72) Inventors: Krishnakant Vijay Saboo, Mumbai (IN); Sandeep Rao, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 329 days.

(21) Appl. No.: 14/633,684

(22) Filed: Feb. 27, 2015

(65) Prior Publication Data

US 2016/0252607 A1    Sep. 1, 2016

(51) Int. Cl.
*G01S 13/02* (2006.01)
*G01S 13/58* (2006.01)
*G01S 7/41* (2006.01)
*G06F 3/01* (2006.01)
*G01S 7/35* (2006.01)

(52) U.S. Cl.
CPC ............ *G01S 13/02* (2013.01); *G01S 7/415* (2013.01); *G01S 13/58* (2013.01); *G01S 13/584* (2013.01); *G06F 3/011* (2013.01); *G06F 3/017* (2013.01); *G01S 2007/356* (2013.01)

(58) Field of Classification Search
CPC ........ G01S 13/02; G01S 13/58; G01S 13/584; G01S 2007/356; G01S 7/415; G06F 3/011; G06F 3/017
USPC ........................................................ 342/107
See application file for complete search history.

(56) References Cited

U.S. PATENT DOCUMENTS

| | | |
|---|---|---|
| 2012/0280900 A1 | 11/2012 | Wang |
| 2013/0165770 A1 | 6/2013 | Li et al. |
| 2013/0261871 A1 | 10/2013 | Hobbs |
| 2014/0266866 A1* | 9/2014 | Swirhun ................. G01S 7/026 342/188 |

FOREIGN PATENT DOCUMENTS

| | | |
|---|---|---|
| WO | 2012153227 | 11/2012 |
| WO | 2016022358 | 2/2015 |

OTHER PUBLICATIONS

Qifan Pu et al, "Whole-Home Gesture Recognition Using Wireless Signals", Proceedings of the 19th Annual International Conference on Mobile Computing and Networking, Sep. 30-Oct. 4, 2013, Miami, FL, pp. 27-38.

Hermann Rohling, "Radar CFAR Thresholding in Clutter and Multiple Target Situations", IEEE Transactions on Aerospace and Electronic Systems, vol. AES-19, Issue 4, Jul. 1983, pp. 608-621.

(Continued)

*Primary Examiner* — Timothy A Brainard
(74) *Attorney, Agent, or Firm* — Ronald O. Neerings; Charles A. Brill; Frank D. Cimino

(57) ABSTRACT

A method for operating a frequency modulated continuous wave (FMCW) radar system is provided that includes generating digital intermediate frequency (IF) signals from radio frequency signals received by a small receive antenna array in the FMCW radar system and processing the digital IF signals to determine whether or not a gesture was performed.

20 Claims, 10 Drawing Sheets

(56) References Cited

OTHER PUBLICATIONS

Chen Zhao et al, "SideSwipe: Detecting In-air Gestures Around Mobile Devices Using Actual GSM Signals", Proceedings of the 27th Annual ACM Symposium on User Interface Software and Technology, Oct. 5-8, 2014, Honolulu, Hawaii, pp. 527-534.
Roland Meyer, "The Use of Wireless Signals for Sensing and Interaction", Ubiquitous Computing Seminar FS2014, ETH Zurich, available at http://www.vs.inf.ethz.ch/edu/FS2014/UCS/reports/RolandMeyer_WirelessSignals_report.pdf, Nov. 3, 2014, pp. 1-6.
Amin Arbabian et al "A 94 GHz mm-Wave-to-Baseband Pulsed-Radar Transceiver with Applications in Imaging and Gesture Recognition", IEEE Journal of Solid-State Circuits, vol. 48, No. 4, Apr. 2013, pp. 1055-1071.

\* cited by examiner

GESTURE RECOGNITION USING FREQUENCY MODULATED CONTINUOUS WAVE (FMCW) RADAR WITH LOW ANGLE RESOLUTION

BACKGROUND OF THE DISCLOSURE

Field of the Disclosure

Embodiments of the present disclosure generally relate to radar systems, and more specifically relates to gesture recognition using a frequency modulated continuous wave (FMCW) radar with low angle resolution.

Description of the Related Art

Gesture recognition technology has many potential uses. For example, gesture recognition may be used to control audio and video devices, consumer electronic devices such as smart phones, tablets and gaming consoles, medical devices, and robots. Further, gesture recognition technology is being rapidly incorporated into user interfaces in vehicles, e.g., to control navigation and infotainment systems. Four main techniques are currently used for gesture recognition: computer vision, ultra-sonic sensing, electric field sensing, and inertial sensing. Some work has also been done in using pulsed radar with high angle resolution capability for gesture recognition.

SUMMARY

Embodiments of the present disclosure relate to methods and apparatus for gesture recognition using frequency modulated continuous wave (FMCW) radar with low angle resolution. In one aspect, a method for operating a frequency modulated continuous wave (FMCW) radar system is provided that includes generating digital intermediate frequency (IF) signals from radio frequency signals received by a small receive antenna array in the FMCW radar system and processing the digital IF signals to determine whether or not a gesture was performed.

In one aspect, a frequency modulated continuous wave (FMCW) radar system is provided that includes a small receive antenna array, a receive channel for each receive antenna in the receive antenna array, each receive channel coupled to a respective receive antenna to generate a digital intermediate frequency (IF) signal from a radio frequency signal received by the receive antenna, and a processor coupled to each receive channel to process the digital IF signals to determine whether or not a gesture was performed.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
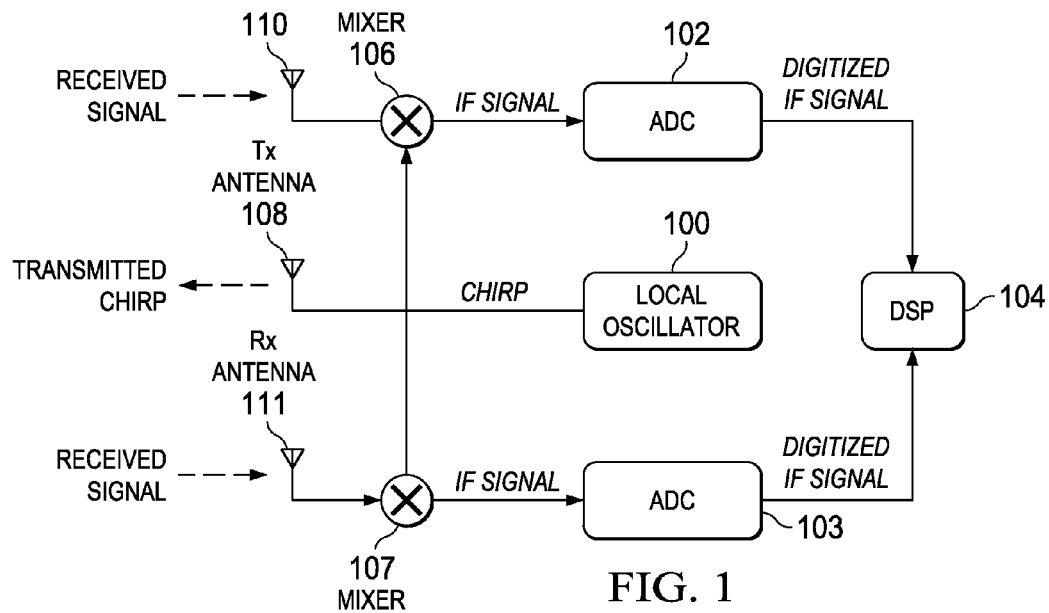
FIG. 1 is a simplified block diagram of an example frequency modulated continuous wave (FMCW) radar system.

Specific embodiments of the disclosure will now be described in detail with reference to the accompanying figures. Like elements in the various figures are denoted by like reference numerals for consistency.

Embodiments of the disclosure provide for gesture recognition using a frequency modulated continuous wave (FMCW) radar system with a small antenna array, i.e., an antenna array with a minimum of one antenna and a maximum of eight antennas, which results in low angle resolution. Prior art work using radar for gesture recognition is in the context of radar with a large antenna array and a correspondingly high angle resolution capability. The use of a large antenna array with the corresponding number of signal chains for processing signals from each antenna results in a higher cost radar device with a larger area than using a small antenna array with a lower angle resolution capability.

FIG. 1 is a simplified block diagram of an example FMCW radar system with a single transmit antenna 108 and two receive antennas 110, 111. A local oscillator 100 in the radar system generates frequency ramps (also referred to as chirps) which are transmitted via the transmit antenna 108. The chirps are also provided to the mixers 106, 107 coupled to the local oscillator 100. An FMCW radar may, for example, transmit a 4 gigaHertz (GHz) bandwidth chirp that ramps from 77 GHz to 81 GHz. Multiple chirps are transmitted sequentially in a unit referred to as a "frame".

Composite radio frequency (RF) signals reflected from the scene in front of the radar are received by the receive antennas 110, 111. The RF signals are received in respective mixers 106, 107 coupled to the receive antennas 110, 111 and mixed with the corresponding chirps from the local oscillator 100 to generate intermediate frequency (IF) signals (alternatively referred to as dechirped signals, beat signals, or raw radar signals). The IF signals are digitized via the respective analog-to-digital converters (ADC) 102, 103 coupled to the mixers 106, 107 and the digitized signals are transmitted to the digital signal processor (DSP) 104 for further processing. For example, the DSP 104 may perform signal processing on the digital signals to extract the range and velocity of objects in the view of the radar. In this context, range refers to the distance of an object from the radar and velocity refers to the relative speed of the object with respect to the radar.

To extract the range, a range Fast Fourier Transform (FFT) is performed on each digital IF signal of a frame of chirps to convert the data to the frequency domain. If there are M time samples in a chirp, M range results are computed for the chirp. Thus, if there are N chirps in a frame, an array of N×M range values is generated by the range FFTs. In this array, which may be referred to as the range-time array, the M columns are the range values for samples at the same relative time across the N chirps.

To extract the velocity, a Doppler FFT is performed over each of the corresponding range values of the chirps in the frame. That is, a Doppler FFT is performed on each of the M columns of the N×M range-time array. The peaks in the resulting N×M range-Doppler plane, also referred to as a range-Doppler array or range-Doppler slice, correspond to the range and relative speed (velocity) of objects.

The combination of the range FFTs and the Doppler FFTs may be referred to as a two dimension (2D) FFT or 2D FFT processing herein.

Figure 2:
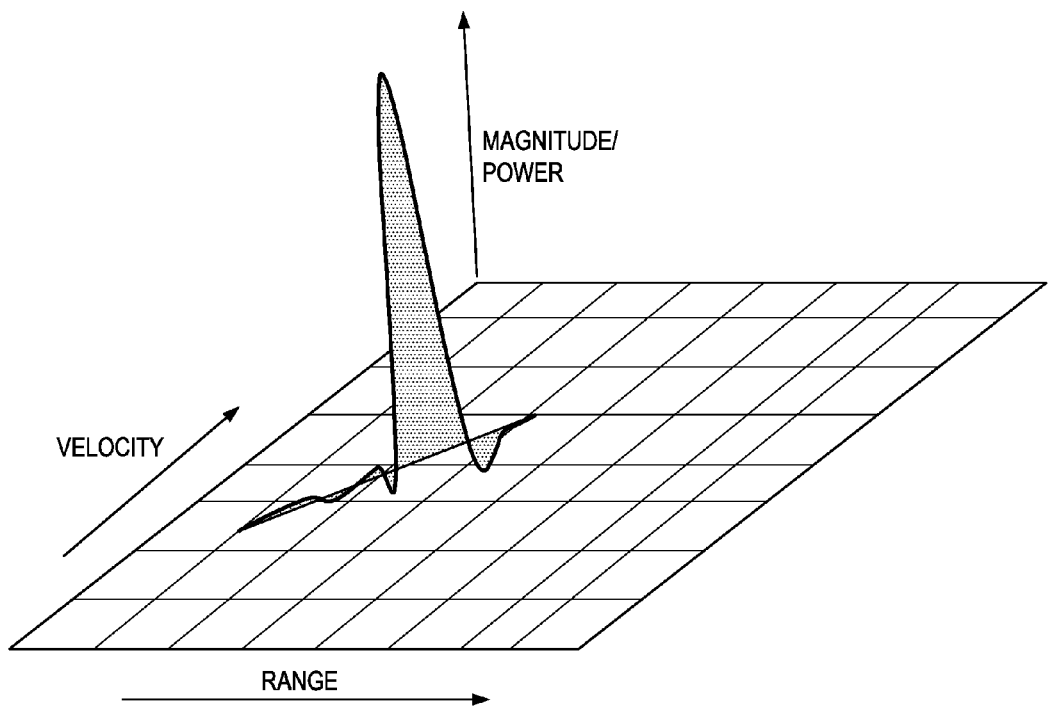
FIG. 2 is an example of a two dimension (2D) Fast Fourier Transform (FFT) grid.

As illustrated in FIG. 2, the result of the 2D FFT processing on a frame of chirps resolves the scene into a 2D grid with range and velocity on the two axes. The cells in this grid are also commonly referred to as bins. Objects in the scene are indicated by peaks in this 2D grid. The x and y coordinates of these peaks are used to provide an estimate of the range and velocity of the objects. More specifically, an object detection algorithm (which may be executed on the DSP 104 or another processor) operates by detecting the peaks in the 2D FFT grids of the two antennas. The object detection may be followed by a tracking algorithm that tracks the detected objects (peaks) across consecutive frames.

Note that if there are multiple objects with the same range and same relative velocity with respect to the radar, the signals of these objects will overlap within the same bin in the 2D grid. Resolving such overlapping objects requires more than one receive antenna. When two (or more) receive antennas are used, the reflected signals will each have a different delay depending on the angle of an object reflecting the signal. A third FFT, i.e., an angle FFT, is performed across the 2D FFT grids (the range-Doppler arrays) for each antenna. Processing of the data from the 2D FFT grid across multiple antennas helps in resolving objects that may have a similar range and similar relative velocity but a different angle with respect to the radar. Note that as used herein, angle may refer to either the azimuth angle and/or the elevation angle (depending on the orientation and shape of the receive antenna array).

An FMCW radar system is thus capable of measuring the range (distance from the radar), velocity (relative velocity with respect to the radar) and angle of objects (with two or more receive antennas) in the field of view of the radar. The range resolution of a radar system depends on the bandwidth of the signal generated by the radar. Hence, increasing range resolution may require a local oscillator that supports a larger bandwidth, which may result in an increase in hardware complexity. As noted earlier, increasing the angle resolution of a radar system requires providing for multiple receive antennas, which results in increasing the cost, area and complexity of the radar system. However, the velocity resolution of the radar system only depends on the chirp frame length. So an increase in velocity resolution can be achieved by increasing the chirp frame length (which can be done by increasing the number of chirps transmitted in a frame). Increase in velocity resolution can be achieved by changing the way the radar hardware is programmed (via firmware), and thus does not necessarily impose any additional restrictions in terms of hardware/cost/area.

Figure 3:
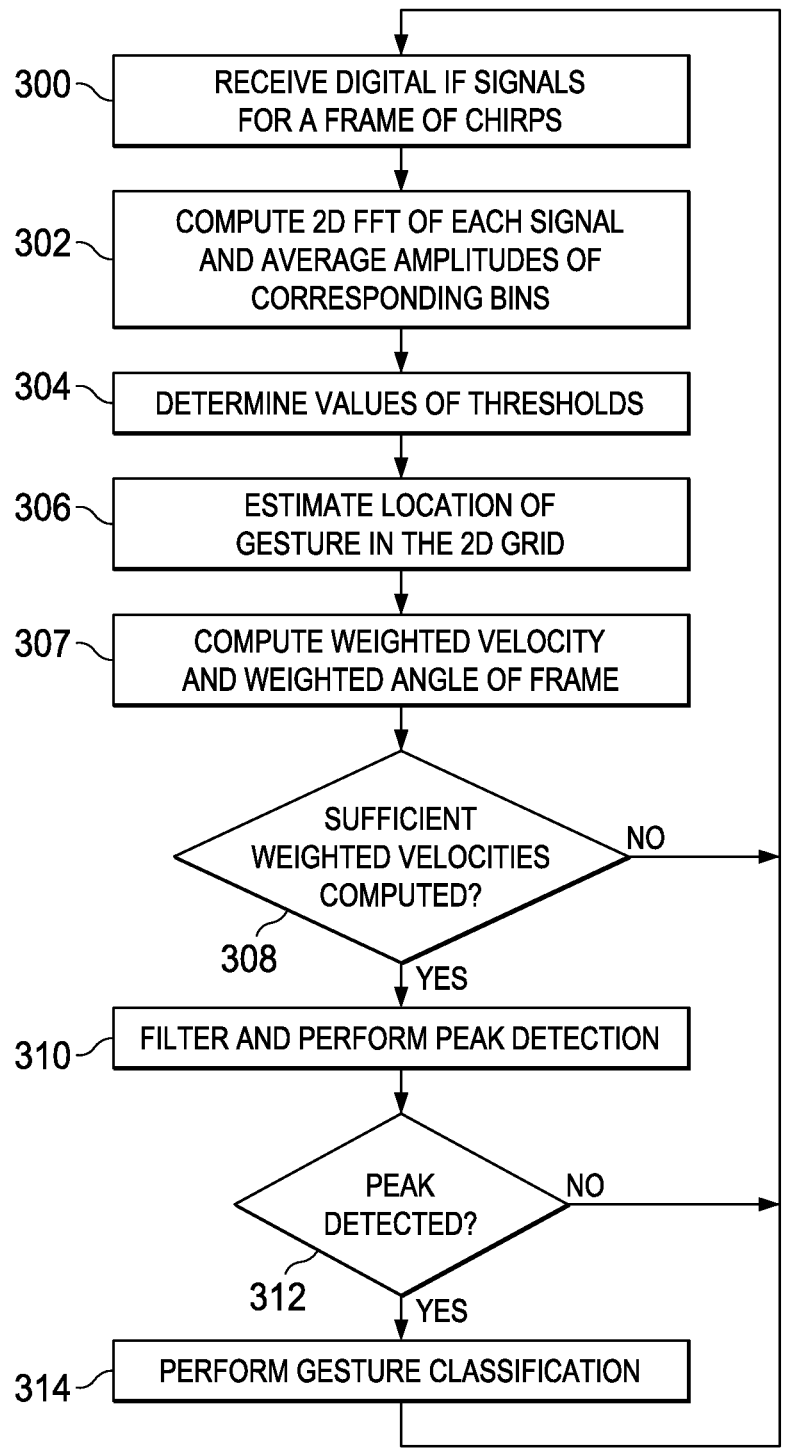
FIG. 3 is a flow diagram of a method for gesture recognition in an FMCW radar system.

Embodiments of the disclosure provide gesture recognition using an FMCW radar system with a small receive antenna array, i.e., 1 to 8 antennas. The gesture recognition is based on the velocity resolution capability of the FMCW radar. FIG. 3 is a flow diagram of a method for gesture recognition that can be implemented in an FMCW radar system. The method recognizes gestures from a predetermined set of gestures in which each gesture has a distinct velocity signature. Velocity signature of a gesture is explained in more detail below. Some example gestures include "come", "go", waving right to left and left to right, waving up and down, closing and opening a fist, and a clap. The particular gestures in the predetermined set of gestures may vary by implementation, and the meaning attached to gestures may also vary by implementation.

Figure 4A:
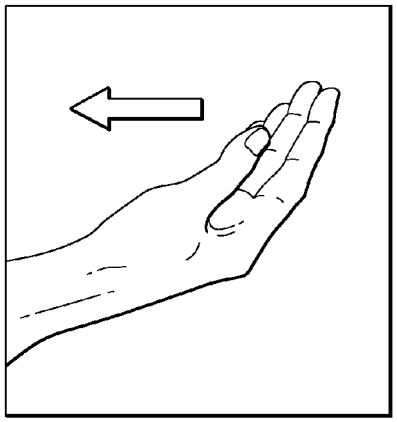
FIGS. 4A-4D are examples of gestures with distinct velocity signatures.
Figure 4B:
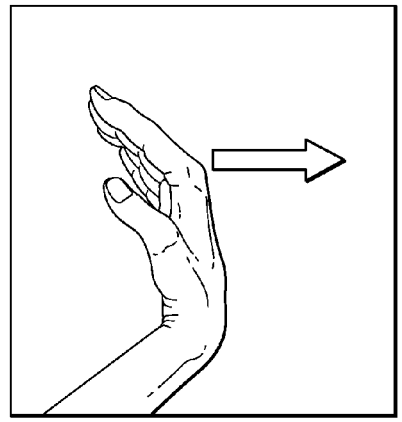
Figure 4C:
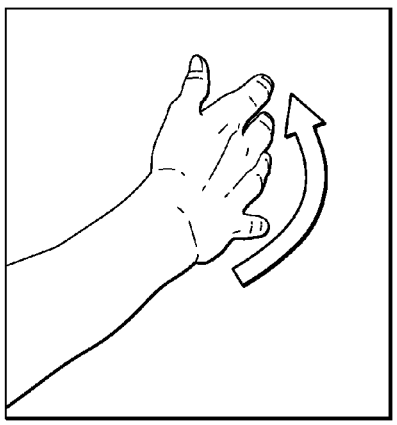
Figure 4D:
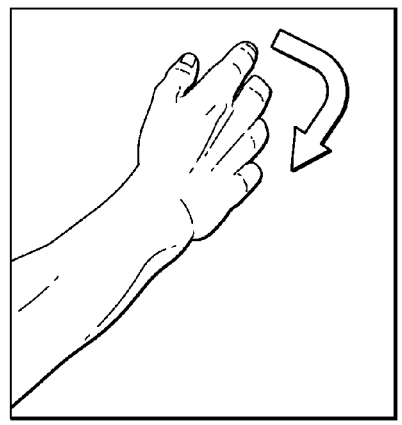

For simplicity of explanation, the method is described assuming that the set of gestures is a "come" gesture, a "go" gesture, and a wave gesture. FIGS. 4A-4D show some examples of these gestures. In particular, FIG. 4A illustrates a "come" gesture, FIG. 4B illustrates a "go" gesture, FIG. 4C illustrates a left to right wave, and FIG. 4D illustrates a right to left wave.

Referring again to FIG. 3, initially digital IF signals (one for each receive antenna in the receive antenna array) for a frame of chirps are received 300, and a 2D FFT is computed 302 for each signal. Further, the amplitudes of the corresponding bins of the multiple 2D FFT grids are averaged to produce a single matrix F (an averaged 2D grid) to be used for weighted velocity and weighted angle computations. For example, if the receive antenna array includes three receive antennas, three digital IF signals are received, a 2D FFT is computed for each of the three signals, and the amplitudes of corresponding bins of the three grids are averaged.

The number of chirps in the frame may be any suitable number that provides the velocity resolution needed to recognize the gestures and may be determined empirically. For example, velocity resolution is given by $$\frac{\lambda}{2T_c N_f}$$

where $N_f$ is the number of chirps in a frame, $T_c$ is the duration of each chirp, and $\lambda$ is the wavelength of the radar. Given a 77 GHz radar where $\lambda$=4 mm (millimeters) and $T_c$=125 μs (microseconds), using $N_f$=256 yields a velocity resolution of 0.06 ms (milliseconds) which was sufficient to recognize gestures in the example gesture set. In some embodiments, the number of chirps in a frame used for gesture recognition is larger than the number of chirps in a frame in normal mode.

Values of various thresholds needed for subsequent computations are also determined 304 based on the input signal and noise levels. The thresholds may include a weighted velocity threshold used for filtering computed weighted velocities and respective amplitude thresholds used in computing weighted velocity and weighted angle. For example, the weighted velocity amplitude threshold may be determined such that 90% of the values in the 2D FFT grid lie below the threshold. In another example, the weighted angle amplitude threshold may be determined such that 95% of the values of the 2D FFT grid lie below the threshold.

The location of the gesture in the 2D FFT grids is also estimated 306, i.e., limits on the range and velocity bins in which the gesture is expected to take place are identified. The values of the upper and lower limits of the indices of the velocity bins, i.e., $-v_{max}$ and $v_{max}$, are predetermined and are based on the maximum expected speed of a typical hand gesture and the velocity resolution. For example, if the velocity of the gestures is within 1.5 m/s (meters per second) and the velocity resolution is 0.06 ms, then $v_{max}$=1.5/0.06=25.

One technique for estimating the limits of the range bins, i.e., $r_{min}$ and $r_{max}$, is now described. If the span or range of a gesture is given by L, this range corresponds to consecutive range indices. The value of is determined by dividing the range L by the range resolution of the radar. For example, if the span of a gesture is typically within 0.4 m (meters) and the range of the radar is 0.04 m, then $r_L$=0.4 m/0.04 m=10 bins.

Figure 5:
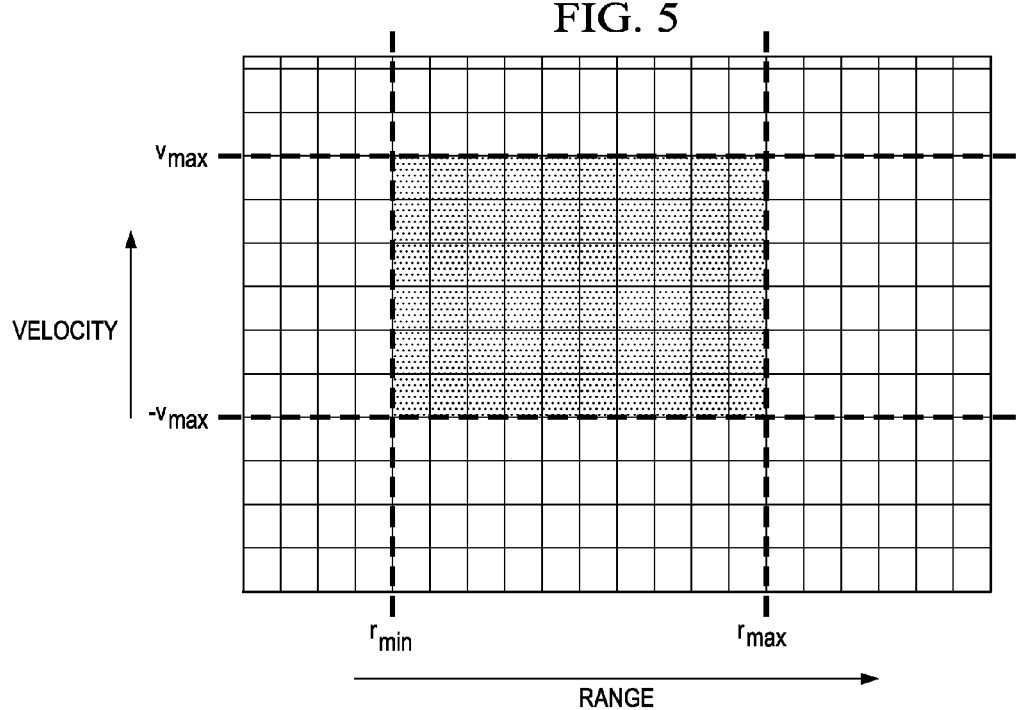
FIG. 5 is an example of a 2D FFT grid with an estimated gesture location.

The total energy in the bins of the 2D FFT grids that lie between range indices k and $k+r_L$, where k=0, 1, 2 ... $N_{range}-r_L-1$, and velocity indices of $(-v_{max}, v_{max})$ is computed, and the value of k yielding the maximum total energy is found. $N_{range}$ is the total number of range bins. The total energy is computed by adding the square of the amplitudes of the bins under consideration in the matrix $F(i_r, i_v)$, where $i_r$ is the range index and $i_v$ is the velocity index. Let $k_{max}$ be the value of k which yields the maximum total energy. The upper and lower limits on the range bins in which the gesture lies are then estimated as $r_{min}=k_{max}$ and $r_{max}=k_{max}+r_L$. FIG. 5 is an example of a 2D-grid with the "shaded" region depicting the broad area defined by the velocity bin indices $(-v_{max}, v_{max})$ and the range bin indices $(r_{min}, r_{max})$. Thus, the estimated location of the gesture is in an area of bins bounded by $(-v_{max}, v_{max})$ and $(r_{min}, r_{max})$.

Once the location of the gesture is estimated in the 2D FFT grid, the weighted velocity and weighted angle for the frame is computed 307 within the estimated location. Weighted velocity is a single number that quantifies the velocity of the hand performing the gesture with respect to the radar. More specifically, weighted velocity quantifies the velocity content in the region of bins corresponding to the estimated location of the gesture. Any suitable technique may be used to compute the weighted velocity.

In some embodiments, the weighted velocity is computed as follows. First, the maximum amplitude of all the bins between the range indices of $r_{min}$ and $r_{max}$ for each velocity index $i_v$ between $-v_{max}$ and $v_{max}$ is computed as per $$w(i_v) = \max_{i_r \in [r_{min}, r_{max}]} F(i_r, i_v)$$

where $F(i_r, i_v)$ is the average amplitude of the signals in corresponding 2D FFT bins with range index $i_r$ and velocity index $i_v$. The resulting list of maximum amplitudes $w(i_v)$ is then pruned to include only those indices $i_v$ such that $w(i_v)$ is greater than the weighted velocity amplitude threshold. This subset of indices is denoted as i'.

In some embodiments, the weighted velocity (WV) for the frame is then computed as per $$WV = \frac{\sum_{i \in i'} w(i) * v(i)}{\sum_{i'} w(i)}$$

where the summation is over the subset of indices i' and v(i) is the velocity corresponding to the index. As is well known, each range index maps to a respective range and each velocity index maps to a unique velocity. In some embodiments, the WV is computed using the base 10 logarithm of w(i) as per $$WV = \frac{\sum_{i \in i'} \log(w(i)) * v(i)}{\sum_{i'} \log(w(i))}.$$

Note that a weighted velocity is calculated for every frame thus creating a weighted velocity sequence which captures the time evolution of the weighted velocity.

Weighted angle is a single number representative of the average angle over the estimated location of the gesture in the 2D FFT grids. More specifically, weighted angle quantifies the angle content in the region of bins corresponding to the estimated location of the gesture. Any suitable technique may be used to compute the weighted angle. In some embodiments, the weighted angle is computed as follows. First, the maximum amplitude of all the bins between the range indices of $r_{min}$ and $r_{max}$ for each velocity index $i_v$ between $-v_{max}$ and $v_{max}$ is computed as per $$w(i_v) = \max_{i_r \in [r_{min}, r_{max}]} F(i_r, i_v)$$

where $F(i_r, i_v)$ is the average amplitude of the signals in corresponding 2D FFT bins with range index $i_r$ and velocity index $i_v$. The angle $\theta(i_v)$ across corresponding bins in the grids is also computed for each maximum amplitude. There are known techniques for estimating such angles across multiple antennas and any suitable technique may be used. One such technique uses an FFT across corresponding grid values in consecutive antennas which is commonly known as receiver beamforming or the $3^{rd}$ dimension FFT. Another such technique is MUSIC (Multiple Signal Classification).

The list of maximum amplitudes $w(i_v)$ is pruned to include only those indices $i_v$ such that $w(i_v)$ is greater than the weighted angle amplitude threshold. This subset of indices is denoted as i'. In some embodiments, the weighted angle (WA) for the frame is then computed as per $$WA = \frac{\sum_{i \in i'} w(i) * \theta(i)}{\sum_{i'} w(i)}$$

where the summation is over the subset of indices i'. In some embodiments, the WA is computed using the base 10 logarithm of w(i) as per
Note that a weighted velocity is calculated for every frame using the technique described above thus creating a weighted velocity sequence which captures the time evolution of the weighted angle $$WA = \frac{\sum_{i \in i'} \log(w(i)) * \theta(i)}{\sum_{i'} \log(w(i))}.$$

Note that a weighted angle is calculated for every frame using the technique described above thus creating a weighted angle sequence which captures the time evolution of the weighted angle.

The computed weighted velocity value and weighted angle value are stored in first-in first-out buffers, referred to as WVbuffer1 and WAbuffer1 herein, and steps 300-307 are repeated for the next frame of chirps. When sufficient weighted velocities have been computed 308 for performing peak detection, peak detection is performed on a sequence of weighted velocities. The number of weighted velocities deemed to be sufficient for peak detection may be implementation dependent and may be determined empirically. A second buffer for storing weighted velocities for peak detection, referred to as WVbuffer2 herein, is sized to store the number of weighted velocities needed for peak detection.

Further, a second buffer for storing weighted angles corresponding to the weighted velocities in WVbuffer2, referred to as WAbuffer2 herein, is similarly sized. The management of WVbuffer1 and WVbuffer2 is now described. WAbuffer1 and WAbuffer2 are similarly managed to maintain corresponding weighted angle values in WAbuffer2.

For example, assume that N weighted velocities from N sequential frames are needed for peak detection. WVbuffer2 is sized to store the N weighted velocities and operates in a first in, first out fashion. Further, other than for the initial filling of WVbuffer2 and after a successful gesture classification, there is an overlap of M weighted velocities between the N weighted velocities used for the previous detection and the next N weighted velocities to be used for peak detection. That is, in the case where no peak is detected or no gesture is classified, the oldest N−M weighted velocities in WVbuffer2 are discarded and N−M weighted velocities are added to WVbuffer2 from WVbuffer1. If a gesture is classified based on a peak detected in the current buffered weighted velocities, the weighted velocities corresponding to that peak and any older weighted velocities are discarded from WVbuffer2 and the buffer is refilled with sufficient new weighted velocities from WVbuffer1 to replace the discarded ones. Any suitable values of N and M, which may be determined by offline experimentation, for example, may be used. In some embodiments, N=78 and M=20.

Figure 6A:
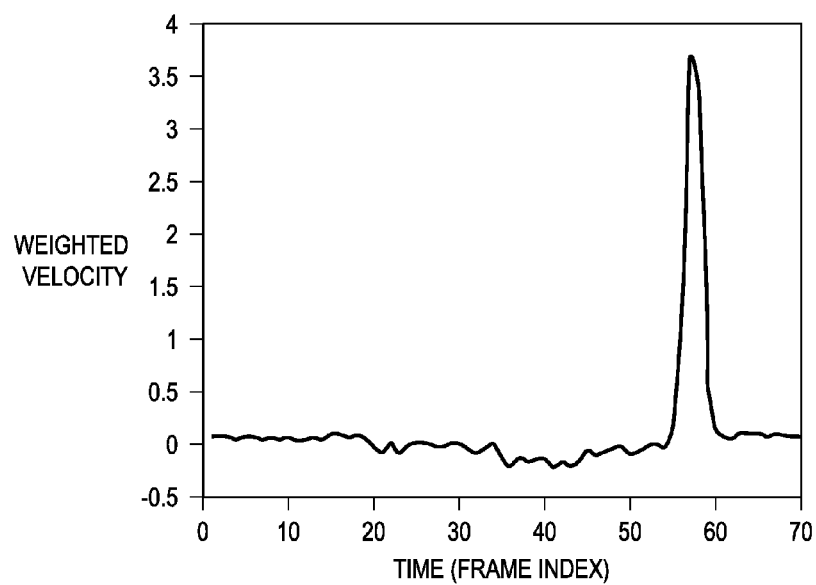
FIGS. 6A-6C are examples of velocity signatures for gestures;]
Figure 6B:
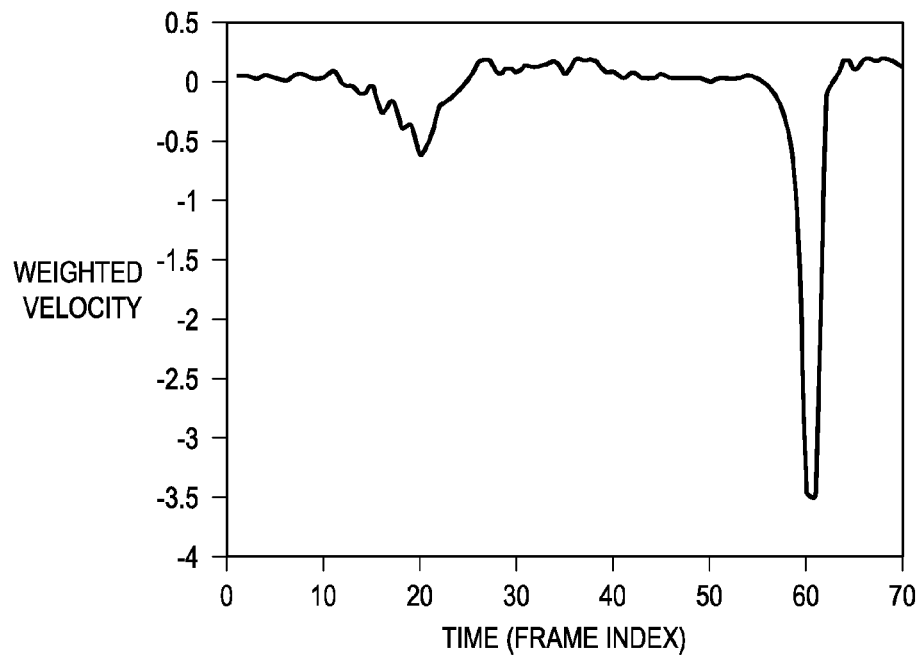
Figure 6C:
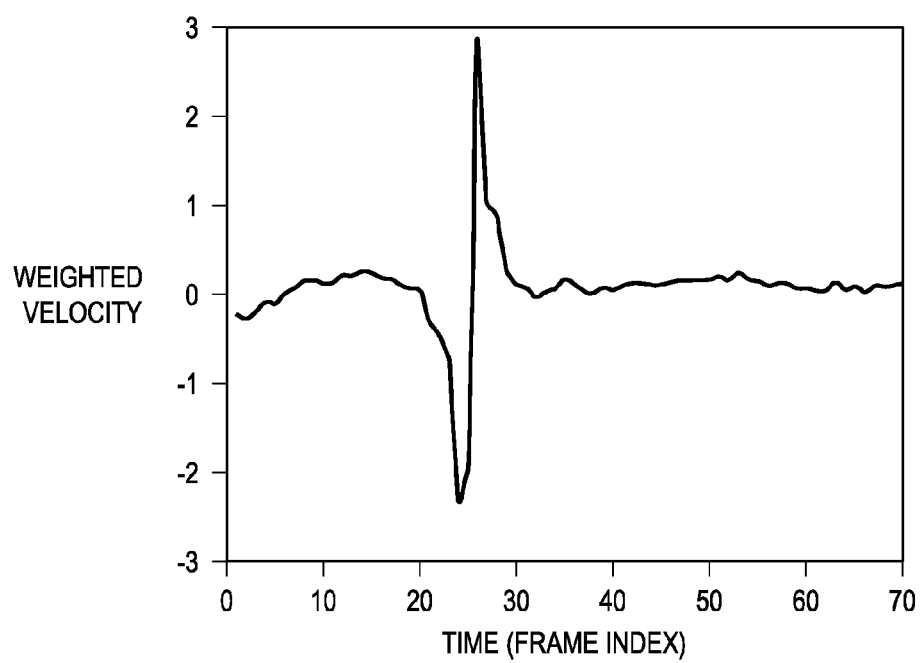

Note that the above steps compute a sequence of weighted velocities over time. Each gesture to be recognized has a distinct weighted velocity sequence, i.e., signature, which can be used to identify the gesture. FIGS. 6A, 6B, and 6C are examples of velocity signatures for, respectively, a "go" gesture, a "come" gesture, and a wave gesture. Note that a "go" gesture has a positive peak, a "come" gesture has a negative peak, and a wave gesture (whether left to right or right to left) has a negative peak followed by a positive peak.

Figure 7A:
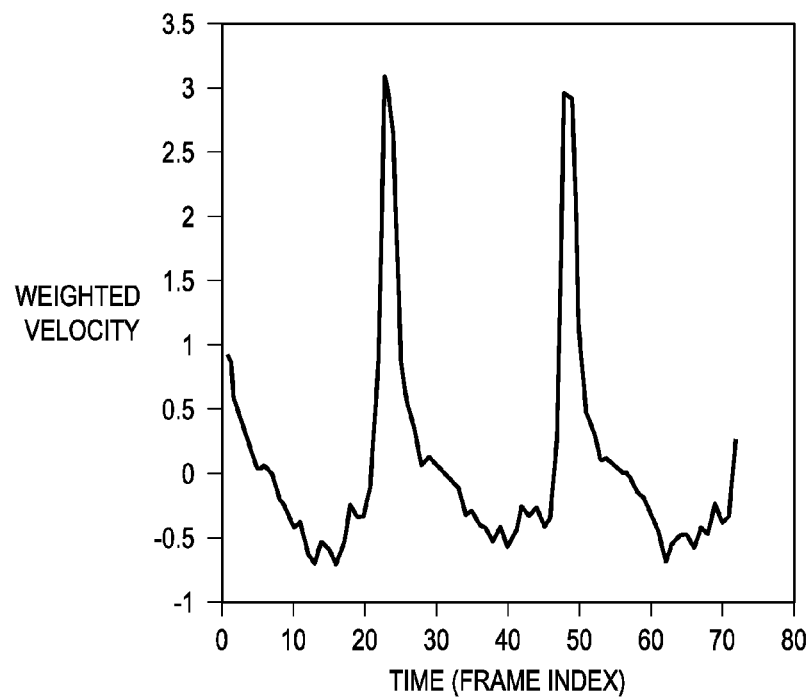
FIGS. 7A and 7B illustrate filtering of a weighted velocity sequence.
Figure 7B:
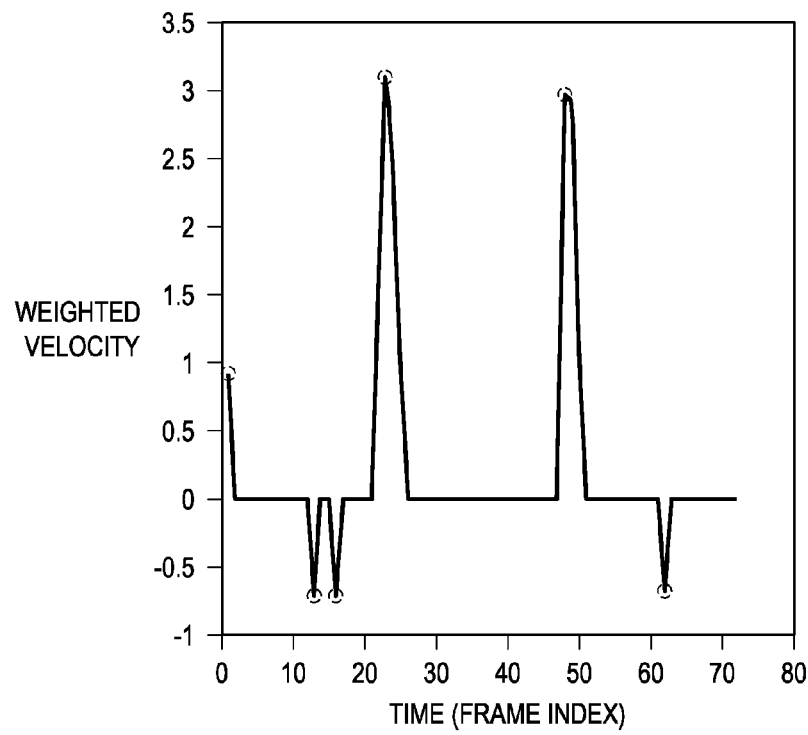

Referring again to FIG. 3, when sufficient weighted velocity values for peak detection are available in WVbuffer2, the accumulated weighted velocities are filtered 310 and peak detection is performed 310 on the filtered weighted velocities in the buffer. The goal of the filtering is to make it easier for subsequent processing stages to extract relevant features from the weighted velocity sequence stored in the buffer. Any suitable filtering may be performed. For example, the filtering may compare any new weighted velocities in the buffer to the previously mentioned weighted value threshold and sets any velocities below the threshold to zero. FIGS. 7A and 7B show, respectively, an example weighted velocity sequence before and after such filtering. In another example, the filtering may be an averaging filter in which each filtered sample with index x is the average of some number of contiguous weighted velocities between x−L/2 and x+L/2, where L is the filter length.

After the weighted velocity values are filtered, peak detection is performed to extract any peaks in the sequence of weighted velocity values in WVbuffer2. Any suitable technique for peak detection may be used. In some embodiments in which the filtering sets any weighted velocities below a threshold to zero, the peak detection may be performed as follows. Due to the threshold based filtering, the filtered weighted velocity sequence is made up of sequences of zeros interspersed with sequences of non-zero values. The peak detection technique identifies each non-zero segment and locates the weighted velocity with the maximum value in the segment. This weighted velocity is identified as a peak.

If no peaks are detected, the process continues. If one or more peaks are identified, relevant parameters are extracted for each identified peak to be used for gesture classification. These parameters may include peak width, distance between adjacent peaks, an error metric, a surrounding noise level, and an adjacent peak ratio.

Figure 8A:
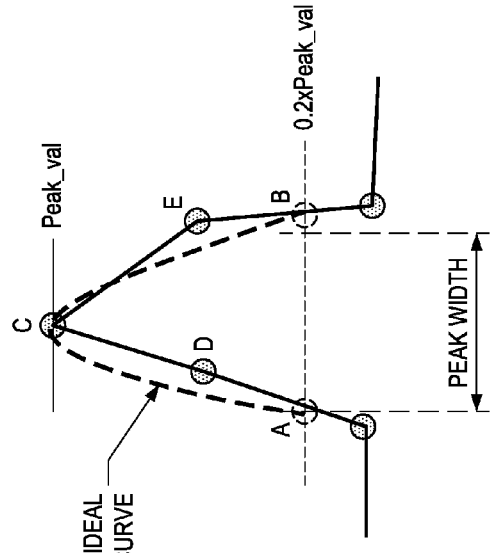
FIGS. 8A-8C illustrate computation of various peak parameters of identified peaks in a weighted velocity sequence.

FIG. 8A illustrates one technique for determining peak width. Two points A and B on either side of the peak having a value of 0.2×Peak_val are identified, where Peak_val is the weighted velocity value of the peak. The distance between these two points is the peak width. Note that the points A and B may need to be interpolated between adjacent weighted velocity values.

Figure 8B:
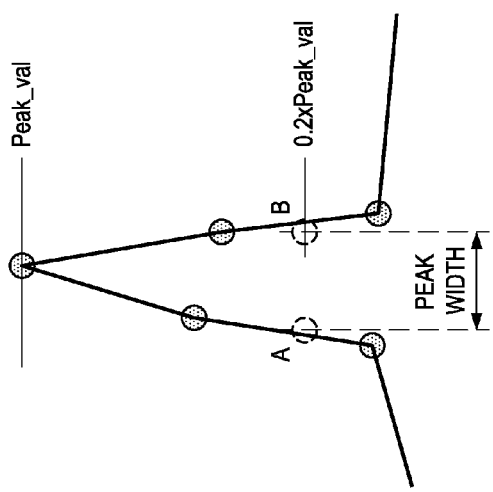

FIG. 8B illustrates one technique for determining the peak error metric. This metric quantifies the shape of the peak as a badly shaped peak could indicate a spurious peak not originating from an intended gesture. In FIG. 8B, C refers to the peak weighted velocity (Peak_val), and A and B refer to the two points that define the peak width. An "ideal curve" is constructed between the points A, B and C using a second order polynomial interpolation. The root mean square (rms) deviation of the samples between A and B, i.e., samples D and E, from this ideal curve is computed and scaled by Peak_val to obtain the error metric.

Figure 8C:
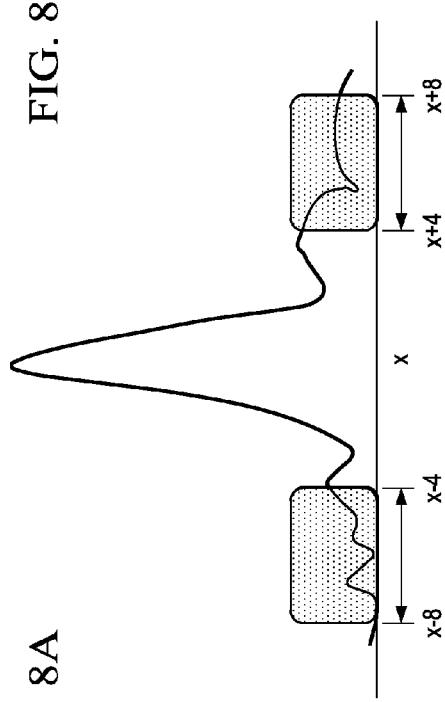

FIG. 8C illustrates one technique for determining the surrounding noise level of a peak. Let x be the index in WVbuffer2 corresponding to the peak. Two windows are identified: a window of weighted velocities to the left of the peak with indices [x−4, x−5, x−6, x−7, x−8] and a window of weighted velocities to the right of the peak with indices [x+4, x+5, x+6, x+7, x+8]. The maximum absolute value of the weighted velocities from both these windows denotes the left and the right noise level respectively.

The distance between adjacent peaks is the difference between the indices of two adjacent peaks. Note that the overlap M used in managing the content of WVbuffer2 ensures that the current buffer content includes adjacent peaks from the previous buffer content. The adjacent peak ratio is the absolute value of the ratio between the magnitudes of two adjacent peaks. Note that these two parameters may have a value of 0 if there are no adjacent peaks.

Figure 9:
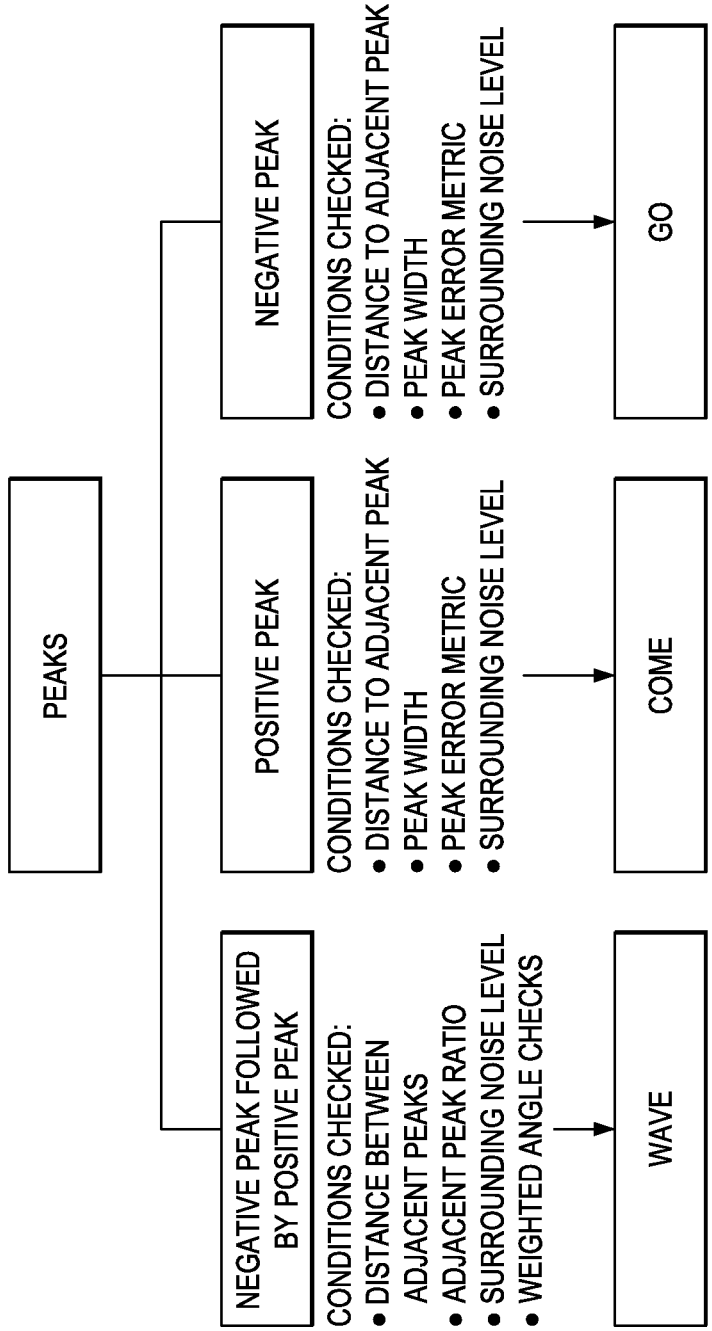
FIG. 9 is a diagram illustrating gesture recognition criteria for various gestures.

Referring again to FIG. 3, if one or more peaks are detected 312, then gesture classification is performed 314 based on the peak parameters. FIG. 9 illustrates example classification criteria for the three predetermined gestures. If there are no adjacent peaks, then only the come and go gestures are considered during classification. If there are adjacent peaks, then the peak parameters are checked for certain criteria to decide if the two peaks correspond to a wave gesture. The following conditions should be met in order for two adjacent peaks to be classified as a wave: the signs of the two peaks should be different, the distance between the two adjacent peaks should be less than six samples, the adjacent peak ratio should be between 0.33 and three, the surrounding noise level to the left of the left peak should be less than 0.3 times the peak value, and the surrounding noise level to the right of the right peak should be less than 0.3 time the peak value.

In addition, the maximum and minimum weighted angle values in WAbuffer2 in the range between one sample to the left of the leftmost peak and one sample to right of the rightmost peak are identified. Additional conditions to be met in order for the two peaks to be identified as a wave are that the maximum weighted angle value is greater than zero, the minimum weighted angle value is less than 0, and the absolute value of the difference between the maximum and minimum weighted angle values is greater than forty degrees.

The weighted angle values may also be used to classify a wave is a left to right or right to left wave. If the difference between the weighted angle values corresponding to the two peaks is negative, the wave is classified as a left to right wave; otherwise, the wave is classified as a right to left wave.

To classify a peak as a "come" or "go" gesture, the following conditions should be met: the distance between the peak and the closest neighboring peak, if any, should be greater than six samples, the peak width should be between 1.8 and 5.5, the peak error metric should be less than 2.5, and the surrounding noise levels to the left and right of the peak should be less than 0.3 time the peak value. If these conditions are met, then the peak is classified as a "come" or "go" gesture based on the sign of the peak value, where a positive sign indicates a "go" gesture and a negative sign indicates a "come" gesture.

One application of gesture recognition as described herein is as a touchless/remote user interface to an FMCW radar having a primary application other than gesture recognition. For example, in an industrial setting, the primary application of the radar may be to measure objects in a defined region. In another example, the primary application of the radar may be to detect occupancy in a vehicle. As is explained in more detail below, in such applications, the radar may be programmed to switch to a gesture recognition mode of operation based on a position cue detected by the radar. Note that the particular gestures to be recognized in gesture recognition mode and the meanings attached to the gestures are application dependent.

In such FMCW radar applications, the chirp configuration used for normal operation, i.e., the primary application, may not be suitable for gesture recognition. For example, the normal mode of operation may have a short frame time, e.g., 5-10 ms, and high duty cycling while a gesture recognition mode may need a longer frame time, e.g., 30 ms, and shorter duty cycling. As is well known, duty cycling refers to the on-off cycle of a radar that may be performed to, for example, save power and reduce heat. The short frame time of the normal mode may not provide a velocity resolution sufficient for measuring the small velocities of hand motion and the high duty cycling leads to a low probability of detecting a gesture. Hence, a way to switch between the normal mode and a gesture recognition mode is desirable.

Figure 10:
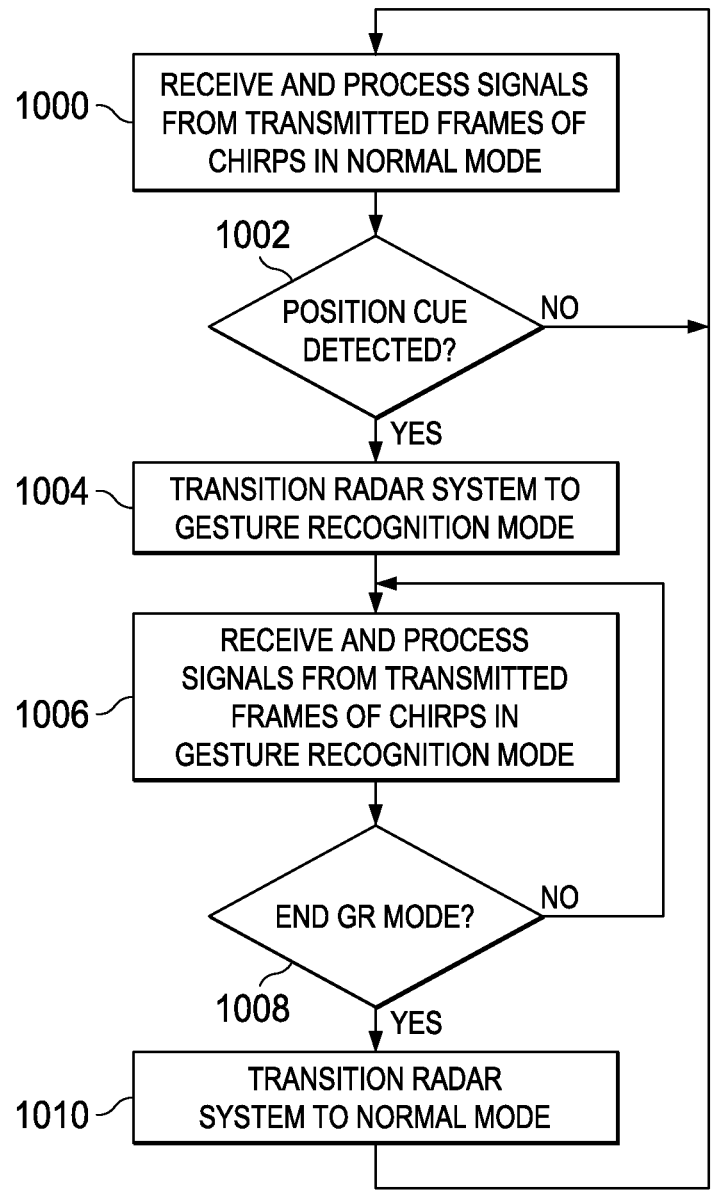
FIG. 10 is flow diagram of a method for switching between normal mode and gesture recognition mode in an FMCW radar system.

FIG. 10 is a flow diagram of a method for switching between normal mode and gesture recognition mode in an FMCW radar system. This method is based on detecting a position cue during normal mode that indicates that the radar system should switch to gesture recognition mode. Examples of position cues include bringing a hand close to the radar or standing in a specific location within view of the radar. If the radar has some elevation angle resolution capability, then cues like raising of a hand may also be used. A position cue will typically not occur in a location where other objects might be located or expected. For example, in the above mentioned industrial setting application, the position cue could be a person standing in a location other than the defined region where objects are expected. In another example, in the above mentioned occupancy detection application, the position cue could be a hand placed in front of the radar as objects would not generally be expected in immediate proximity to the radar.

As shown in FIG. 10, in the FMCW radar system, signals from transmitted frames of chirps are received and processed 1000 in the normal operating mode of the radar system. Normal operating mode is the mode that supports the primary application of the radar system. The receiving and processing 1000 continues until a position cue is detected 1002. A position cue may be detected, for example, by detecting the appearance of an object in a predefined area. The range profile of a detected object (ranges of detected points corresponding to the object) and the elevation profile (if available) of the object (elevation angles of the detected points corresponding to the object) may also be considered to detect a position cue.

When a position cue is detected 1002 during normal mode, the radar system is transitioned 1004 to gesture recognition (GR) mode. The transitioning may include changing the frame time and duty cycling of the radar system to a frame time and duty cycle appropriate for gesture recognition. Frame time can be increased by increasing the number of chirps in a frame.

The radar system then begins to receive and process 1006 signals from transmitted frames of chirps in gesture recognition mode. The gesture recognition may be performed, for example, as per an embodiment of the method of FIG. 3. Operation of the radar system in gesture recognition mode continues 1008 until termination of the mode is indicated. Any suitable indicator may be used for terminating gesture recognition mode. For example, a specific recognized gesture may be used to indicate termination or the mode may be terminated after recognition of a single gesture or the mode may be terminated after a specific time period.

When gesture recognition mode is terminated 1008, the radar system is transitioned 1010 to normal mode, and operation continues 1000 in normal mode. The transitioning may include changing the frame time and duty cycling of the radar system to the frame time and duty cycle in place prior to switching to gesture recognition mode.

Figure 11:
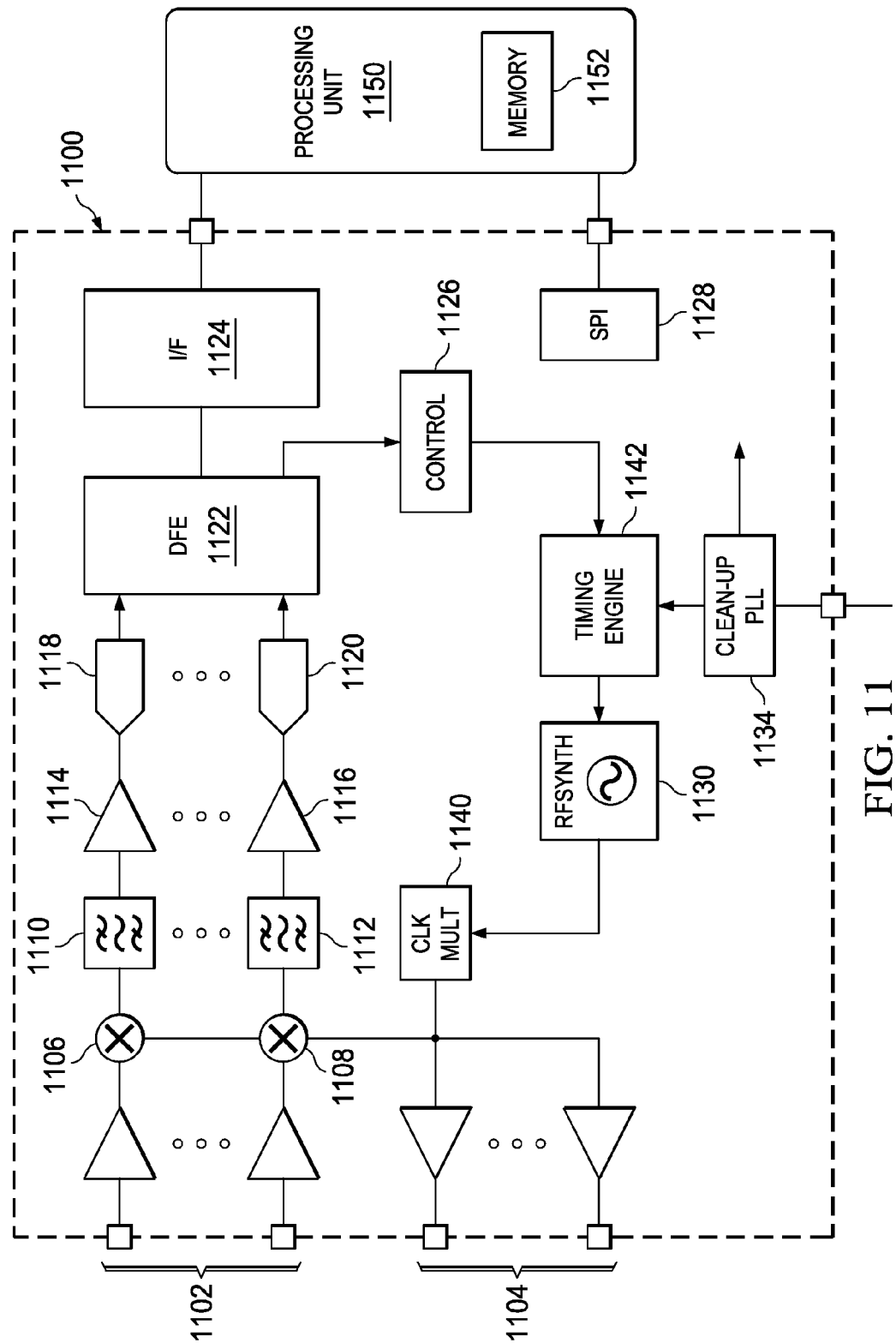
FIG. 11 is a block diagram of an example FMCW radar system including an FMCW radar system-on-a-chip (SOC).

FIG. 11 shows a block diagram of an example FMCW radar system configured to support gesture recognition, and, in some embodiments, switching between a normal operation mode for a particular application and gesture recognition mode. The radar system includes a processing unit 1150 and an FMCW radar system-on-a-chip (SOC) 1100. The radar SOC 1100 may include multiple transmit channels 1104 for transmitting FMCW signals and multiple receive channels 1102 for receiving the reflected transmitted signals. Further, the number of receive channels may be larger than the number of transmit channels. For example, an embodiment of the radar SOC 1100 may have two transmit channels and four receive channels. A transmit channel includes a suitable transmitter and antenna. A receive channel includes a suitable receiver and antenna. Further, each of the receive channels 1102 are identical and include a mixer 1106, 1108 to mix the transmitted signal with the received signal to generate a beat signal (alternatively referred to as a dechirped signal, intermediate frequency (IF) signal, or raw radar signal), a baseband bandpass filter 1110, 1112 for filtering the beat signal, a variable gain amplifier (VGA) 1114, 1116 for amplifying the filtered beat signal, and an analog-to-digital converter (ADC) 1118, 1120 for converting the analog beat signal to a digital beat signal.

The receive channels 1102 are coupled to a digital front end (DFE) 1122 that performs decimation filtering on the digital beat signals to reduce the sampling rate and bring the signal back to baseband. The DFE 1122 may also perform other operations on the digital beat signals, e.g., DC offset removal. The DFE 1122 is coupled to high speed interface component 1124 to transfer the output of the DFE 1122 to the processing unit 1150.

The processing unit 1150 performs an embodiment of the gesture recognition method of FIG. 3 on the received digital beat signals. The processing unit 1150 may include any suitable processor or combination of processors. For example, the processing unit 1150 may be a digital signal processor, an MCU, an FFT engine, a DSP+MCU processor, a field programmable gate array (FPGA), or an application specific integrated circuit (ASIC). In some embodiments, the external processing unit 1150 also performs an embodiment of the method for mode switching of FIG. 10.

The memory component 1152 provides storage, e.g., a computer readable medium, which may be used, for example, to store software instructions executed by processing unit 1150 such as any software instructions for implementing gesture recognition, and, in some embodiments, any software instructions for implementing mode switching. The memory component 1152 may include any suitable combination of read-only memory and/or random access memory (RAM), e.g., static RAM.

The control component 1126 includes functionality to control the operation of the radar SOC 1100. The control component 1126 may include, for example, an MCU that executes software to control the operation of the radar SOC 1100.

The serial peripheral interface (SPI) 1128 provides an interface for communication with the processing unit 1150. For example, the processing unit 1150 may use the SPI 1128 to send control information, e.g., timing and frequencies of chirps, output power level, triggering of monitoring functions, etc., to the radar SOC 1100.

The programmable timing engine 1142 includes functionality to receive chirp parameter values for a sequence of chirps in a radar frame from the control component 1126 and to generate chirp control signals that control the transmission and reception of the chirps in a frame based on the parameter values.

The radio frequency synthesizer (RFSYNTH) 1130 includes functionality to generate FMCW signals for transmission based on chirp control signals from the timing engine 1142. In some embodiments, the RFSYNTH 1130 includes a phase locked loop (PLL) with a voltage controlled oscillator (VCO).

The clock multiplier 1140 increases the frequency of the transmission signal from the RFSYNTH 1130 to the frequency of the mixers 1106, 1108. The clean-up PLL (phase locked loop) 1134 operates to increase the frequency of the signal of an external low frequency reference clock (not shown) to the frequency of the RFSYNTH 1134 and to filter the reference clock phase noise out of the clock signal.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which the gesture classification is heuristic in nature. One of ordinary skill in the art will understand embodiments in which the classification may be performed using machine learning techniques, e.g., support vector machines, to derive an optimal classification scheme based on peak parameters and a training sequence.

In another example, embodiments have been described herein in which the limits on the range bins for weighted velocity computation are determined for each frame of chirps. One of ordinary skill in the art will understand embodiments in which these limits may be predetermined, e.g., there is an expected location where gestures are to be performed.

In another example, embodiments have been described herein in which thresholds used for pruning and filtering are computed for each frame of chirps. One of ordinary skill in the art will understand embodiments in which one or more of the thresholds may be predetermined, e.g., by experimentation.

In another example, embodiments have been described herein in which the FMCW radar system has a small receive antenna array with more than one receive antenna. One of ordinary skill in the art will understand embodiments in which the radar system has a single receive antenna. In such embodiments, the weighted angle computation is not used and F is the 2D FFT grid computed from the digital IF signal of the single antenna.

In another example, one of ordinary skill in the art will understand embodiments in which filtering of the weighted velocities is not performed.

In another example, embodiments have been described herein in which the processing unit is external to the FMCW radar SOC. One of ordinary skill in the art will understand embodiments in which the processing unit is included in the SOC.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A method for operating a frequency modulated continuous wave (FMCW) radar system, the method comprising:
   generating digital intermediate frequency (IF) signals from radio frequency signals received by a small receive antenna array in the FMCW radar system;
   computing a sequence of weighted velocities based on the digital IF signals;
   detecting at least one peak in the sequence of weighted velocities; and performing gesture classification based on parameters of the at least one peak to determine whether or not the at least one peak is indicative of a gesture.

2. The method of claim 1, in which the small receive antenna array consists of one receive antenna.

3. The method of claim 1, including filtering the sequence of weighted velocities prior to the detecting at least one peak.

4. The method of claim 1, in which processing the digital IF signals includes computing a sequence of weighted angles based on the digital IF signals, and in which performing gesture classification includes performing gesture classification based on the parameters and on weighted angles corresponding to the at least one peak.

5. The method of claim 1, in which the at least one peak includes two peaks and performing gesture classification includes recognizing the two peaks as a gesture and determining a direction of the gesture based on a sign of a weighted angle corresponding to a first peak of the two peaks and a sign of a weighted angle corresponding to a second peak of the two peaks.

6. The method of claim 1, in which computing a sequence of weighted velocities includes:
    receiving a plurality of digital IF signals, one from each antenna of the antenna array;
    computing a two dimension (2D) FFT for each digital IF signal of the plurality of digital IF signals to generate a 2D grid for each IF signal;
    averaging amplitudes of corresponding bins of the 2D grids to generate an averaged 2D grid; and
    computing a weighted velocity based on an expected location of a gesture in the averaged 2D grid.

7. The method of claim 6, in which computing a sequence of weighted velocities includes estimating the expected location.

8. The method of claim 1, including:
    detecting a position cue while the FMCW radar system is operating in a normal mode having a first frame time and a first duty cycle;
    transitioning the FMCW radar system to a gesture recognition mode responsive to the position cue, the gesture recognition mode having a second frame time and a second duty cycle; and
    operating the FMCW radar system in the gesture recognition mode in which the generating digital IF signals and the processing the IF signals are performed.

9. The method of claim 8, including:
    receiving an indication to terminate the gesture recognition mode; and
    transitioning the FMCW radar to the normal mode.

10. A frequency modulated continuous wave (FMCW) radar system comprising:
    a small receive antenna array;
    a receive channel for each receive antenna in the receive antenna array, each receive channel coupled to a respective receive antenna to generate a digital intermediate frequency (IF) signal from a radio frequency signal received by the receive antenna array;
    a digital front end coupled to receive the digital IF signals and produce digital baseband signals; and
    a processor coupled to each receive channel to process the digital baseband signals, compute a sequence of weighted velocities from the baseband signals, and detect at least one peak in the sequence of weighted velocities to determine whether or not a gesture was performed.

11. The FMCW radar system of claim 10, in which the small receive antenna array consists of one receive antenna.

12. The FMCW radar system of claim 10, wherein the receive channel is configured to filter an intermediate frequency and produce the digital IF signals.

13. The FMCW radar system of claim 10, wherein the processor is configured to compute a sequence of weighted angles based on the baseband signals, and perform gesture classification based on parameters of the at least one peak and on weighted angles corresponding to the at least one peak.

14. The FMCW radar system of claim 13, in which the at least one peak includes two peaks and performing gesture classification includes recognizing the two peaks as a gesture and determining a direction of the gesture based on a sign of a weighted angle corresponding to a first peak of the two peaks and a sign of a weighted angle corresponding to a second peak of the two peaks.

15. The FMCW radar system of claim 10, in which computing a sequence of weighted velocities includes:
    computing a two dimension (2D) FFT for each receive channel to generate a 2D grid receive channel;
    averaging amplitudes of corresponding bins of the 2D grids to generate an averaged 2D grid; and
    computing a weighted velocity based on an expected location of a gesture in the averaged 2D grid.

16. The FMCW radar system of claim 15, in which computing a sequence of weighted velocities includes estimating the expected location.

17. The FMCW radar system of claim 10, in which the FMCW radar system is configured to operate in a normal mode and a gesture recognition mode, the normal mode having a first frame time and a first duty cycle and the gesture recognition mode having a second frame time and a second duty cycle, in which the processor causes the FMCW radar system to transition from normal mode to gesture recognition mode responsive to a position cue detected in digital IF signals received from the receive channels while the FMCW radar system is operating in normal mode.

18. The FMCW radar system of claim 17, in which the processor causes the FMCW radar system to transition from gesture recognition mode to normal mode responsive to receiving an indication to terminate gesture recognition mode.

19. A method for operating a frequency modulated continuous wave (FMCW) radar system, the method comprising:
    generating digital baseband signals from radio frequency signals received by an antenna array of the FMCW radar system;
    computing a sequence of weighted velocities from the digital baseband signals;
    detecting at least one peak in the sequence of weighted velocities; and
    performing gesture classification based on parameters of the at least one peak to determine whether or not the at least one peak is indicative of a gesture.

20. The method of claim 19, comprising computing a sequence of weighted angles from the digital baseband, wherein the gesture classification is based on the parameters and on a weighted angle of to the at least one peak.

\* \* \* \* \*